MARTIN DVORIN
*INVENTOR.*

BY Frank C. Parker

ATTORNEY

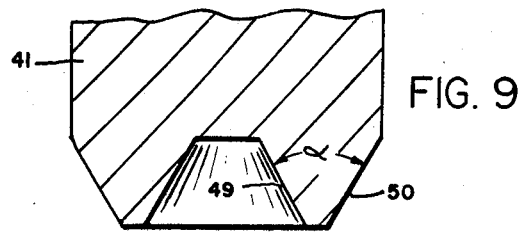
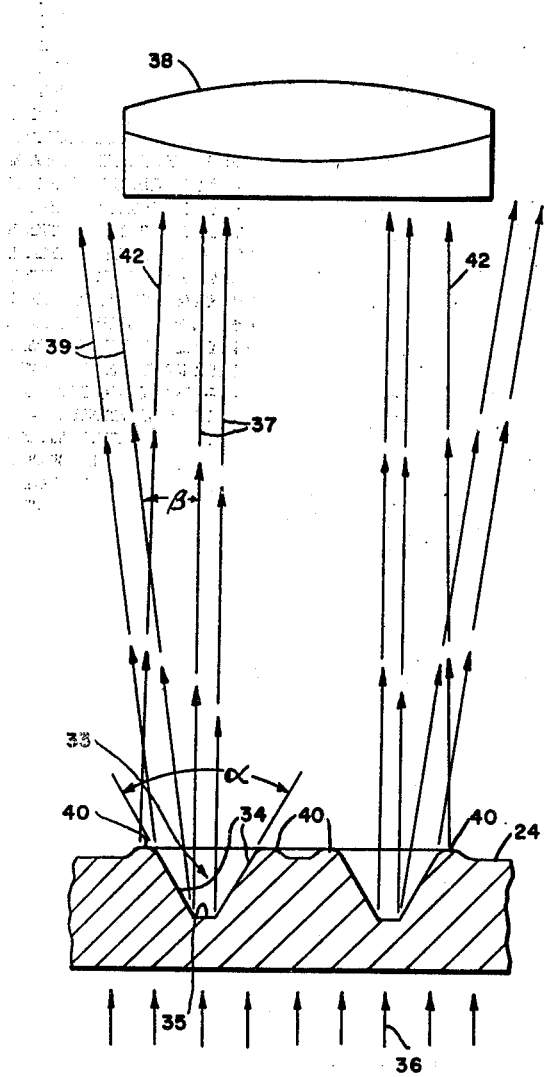
FIG. 6
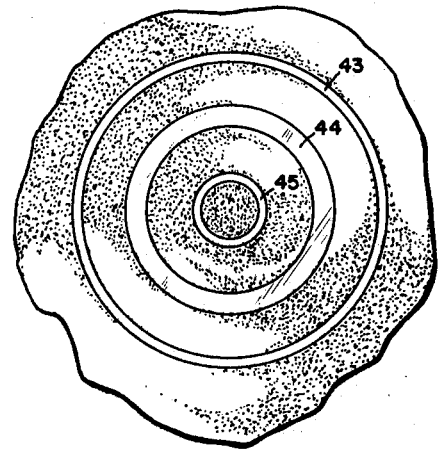
FIG. 9
FIG. 7
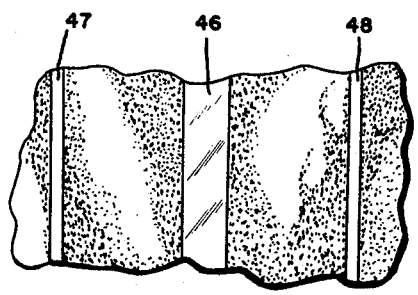
FIG. 8
MARTIN DVORIN
INVENTOR.
BY *Frank C. Parker*
ATTORNEY

United States Patent Office 3,497,576
Patented Feb. 24, 1970

3,497,576
METHOD FOR PERMANENTLY IMPRINTING AN IDENTIFICATION MARK IN THE SURFACE OF A HEAT-SOFTENABLE MATERIAL
Martin Dvorin, Brighton, N.Y., assignor to Bausch & Lomb Incorporated, Rochester, N.Y., a corporation of New York
Continuation of application Ser. No. 532,976, Mar. 9, 1966. This application Mar. 17, 1969, Ser. No. 808,381
Int. Cl. B29d 11/00
U.S. Cl. 264—1                                  5 Claims

ABSTRACT OF THE DISCLOSURE

A fiducial mark is formed in a sheet of thermoplastic material by a method which includes the steps of moving a heat conductive die into contact with the surface under a definite light pressure at the desired position for the marking, heating the die, continuing the pressure while the die and surface cool, and withdrawing the die from the surface.

---

This is a continuation of application Ser. No. 532,976 filed Mar. 9, 1966 and now abandoned.

The present invention relates to an identification or fiducial mark and to a thermal method for permanently indenting said marks into the surface of a heat-softenable material and more particularly relates to an improved method for applying such a mark by the application of a heated marking die to a thermoplastic sheet, film, or coating.

Although the practice of marking the surface of plastic films and sheet materials by scratches, indentations, punch marks and pin pricks is old in the art, such marks are not well adapted to the precision requirements of certain presently used technologies. Photogrammetry and metrology techniques, for instance, are becoming increasingly more exact and precise in an effort to upgrade the useful data to be derived from aerial photographs, for example. Other technologies, such as photographic scale production, often utilize identifying markings to point out certain details of the structure.

It is an object of the present invention to provide a unique identification or fiducial mark and a method for imprinting said mark on heat-softenable sheet materials, films or coatings in a clean and clear pattern without stringy residue or minute fragmentation so that the mark may be precisely located at a prescribed plate.

It is a further object to provide such a method which is particularly suitable for applying said mark which may have a variety of profile shapes and sizes, said mark being adaptable to scanning by electronic means.

A still further object is to provide such a method which is expeditious and has an optimized time-temperature cycle wherein the mark so produced is easily detectable whether formed in clear or somewhat pigmented plastic material and regardless of variations in humidity.

Further objects and advantages are to be found in the variations of the method to meet various marking problems and reference may be had to the specification for a detailed description of the mark and said method, reference being had to the accompanying drawings, wherein:

FIG. 6 is a cross-sectional view of an advantageous form of mark which may be produced by the method and die hereinafter disclosed, said mark being shown in relation to a viewing lens system diagrammatically;

FIG. 7 is a fragmentary plan view of a surface as it appears when marked with a circular die according to FIG. 6;

FIG. 8 is a fragmentary plan view similar to FIG. 7 showing the appearance of a straight mark; and FIG. 9 is a cross-sectional view of a circular marking die used for forming the mark shown in FIG. 6.

Figures 1A, 1B, 1C, 1D, 1E:
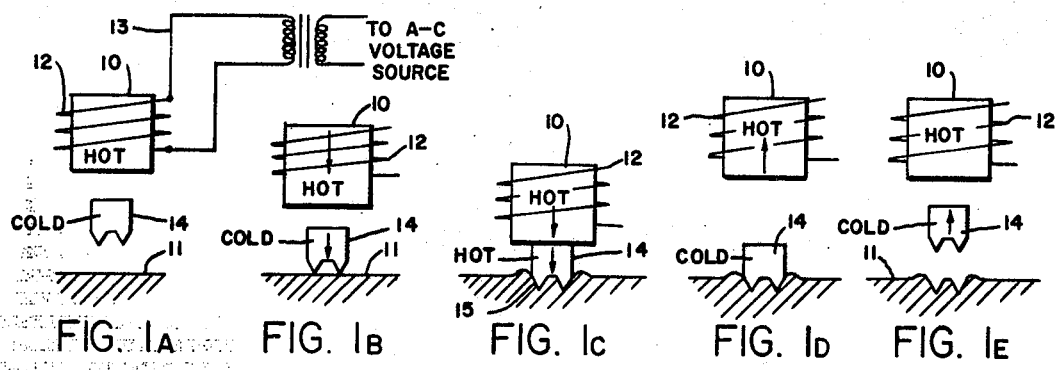
FIG. 1A is a diagrammatic view showing the idle position of a form of apparatus used in effecting the novel method of the present invention.
FIGS. 1B, 1C, 1D and 1E show the progressive steps in said method.

It will be understood from a study of the drawing that the method of the present invention may be carried out by a considerable variety of diversified means. The choice between any of said means depends primarily although not exclusively upon the size of the required mark. Other factors which influence the choice of the marking means are the mass of the heat sink (thermoplastic material), the desired operating rate, depth of mark, etc.

THE METHOD

In all of its variations, the novel method involves the consecutive steps of:

(a) Storing potential energy in a transferable or transducable relation to a marking die, (b) Moving the marking die into positive contact with the surface of a heat-softenable material, such as for instance a thermoplastic film, and maintaining a light pressure thereon, (c) Releasing a predetermined quantity of said transducable energy into said marking die to heat the die, (d) Cooling the die in contact with said material, (e) Subsequently withdrawing said die.

With reference to FIGS. 1A to 1E, one sequence of operations for effecting the present invention is shown wherein the transfer of heat to said die is accomplished by conduction which is particularly adapted to the heat of large marking dies. In FIG. 1A is shown the first step wherein a heated metallic body 10 is provided having guide means, not shown, for guiding its motion in a direction toward a heat-softenable and heat-deformable surface 11 such as for instance the surface of a sheet or film of thermoplastic material. The metallic body 10 may be heated to any desired potential heat level by suitable means such as the electrical resistance 12 which is energized by an electrical circuit 13.

The metallic body 10 is spaced away from the surface 11 at idle position by a prescribed space wherein a heat conducting and independent marking die 14 is located. Said die 14 is movably mounted for motion normal to said surface 11 initially into positive contact with said surface with a light substantially constant pressure by any suitable means, not shown. This initial movement of the die 14 as illustrated in FIG. 1B, causes the cold die to contact the surface 11 at a prescribed position thereon.

The next step is shown in FIG. 1C wherein the hot body 10 is moved into contact with the die 14 to heat it, the heat potential of the body 10 being of such a value that the required quantity of heat will be quickly transferred to the die in a brief given period of time.

The duration of the heating period depends not only on the aforesaid heat potential but is dependent as well on the heat transmission characteristics of the die and on the mass of the object 11 in which the die is imprinted.

The detailed characteristics of the die 14 are discussed hereinafter.

During the heating of the die 14, the aforementioned light and constant pressure of the die against surface 11 is continued which quickly results in the imprinting of the die to an optimum depth in said surface. As far as the duration of the heating period is concerned, it is found that the smallest dies require only a few milliseconds to effect the imprinting operation whereas larger dies require correspondingly longer heating periods.

Primarily for the purpose of preventing the development of strings, fibers and fragmentation of the edges of the imprinted mark 15 when the die 14 is separated therefrom, the die 14 is allowed to cool in contact with the thermoplastic material 11 after retraction or disengagement of the hot body 10 as shown in the next step in FIG. 1D. This procedure further tends to shorten the cooling period since the thermoplastic material is relatively cooler than the die and during said period the aforesaid light pressure of the die 14 against the surface 11 is continued.

In the final step of the method as illustrated in FIG. 1E, the aforesaid pressure is discontinued and the die 14 is retracted to idle position in readiness for repetition of the operating cycle.

As mentioned heretofore, the novel method of the present invention may be carried out with some variations, particularly as regards the nature of the heating means. The method of variation next described herebelow is best suited for smaller marking dies of an intermediate or small size, said method including a timed electrical heating period for said die.

Figures 2A, 2B, 2C, 2D, 2E:
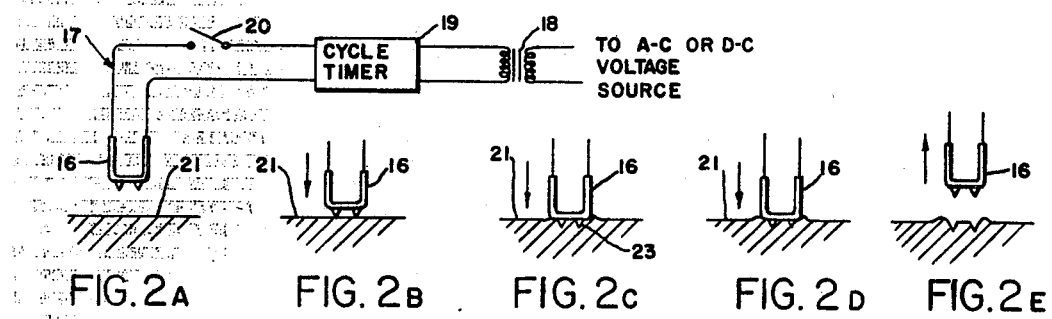
FIG. 2A is a diagrammatic view of a variation of said method shown in idle position.
FIGS. 2B, 2C, 2D and 2E show the progressive steps following FIG. 2A.
Figure 3:
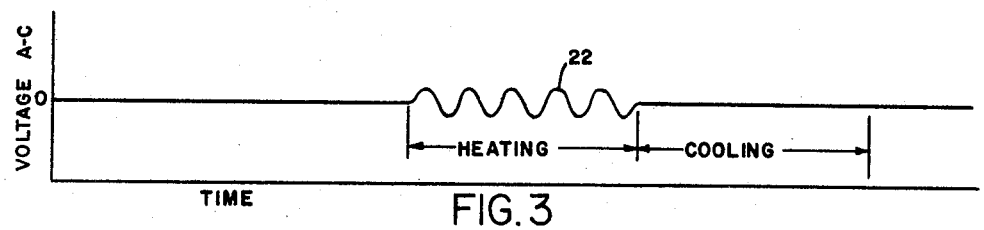
FIG. 3 is an electrical time-voltage graph showing the application of electrical power during the method step shown in FIG. 2C.

In this variation of the method, a marking die 16 is constructed as a part of an electrical circuit 17 wherein the die functions electrically as a resistor. Such a die is shown in FIG. 2A in idle position and said die is energized from a suitable source such as an A-C transformer 18 which is connected to said die by way of a cycle timer 19 which functions to limit the application of electrical energy to the die to a definite elapsed period after the switch 20 is closed. In FIG. 2 is shown the die 16 moved by a light pressure into positive contact with a heatsoftenable surface 21 in readiness for the application of heat and this constitutes a distinctive step. The next step is the heating period as represented by the wavy line 22 in the voltage time graph shown in FIG. 3, the duration of heating of the die 16 being controlled by the cycle timer 19 following the closure of the switch 20 and being of a duration which is largely dependent on the heat sink properties of the material 21 in which the mark 23 is formed. Of course, it is important in this apparatus that the marking die 16 have a resistance which is much higher than any other portion of the electrical circuit 17 so as to heat quickly to a satisfactory heated condition. The duration of the heating period is of the order of 100–500 milliseconds.

Following the aforesaid heating period, the die 16 is maintained by a continuation of the aforesaid light pressure against the thermoplastic heat-softenable material 21 for a period of time in which the die cools. During the cooling period the material 21 acts as a cooling agent so that as the die is subsequently withdrawn, as shown in FIG. 2E, there would be no fragmentation of the edge of the mark and the mark made by the die will be clean and highly visible under proper magnification.

Figures 4A, 4B, 4C, 4D, 4E:
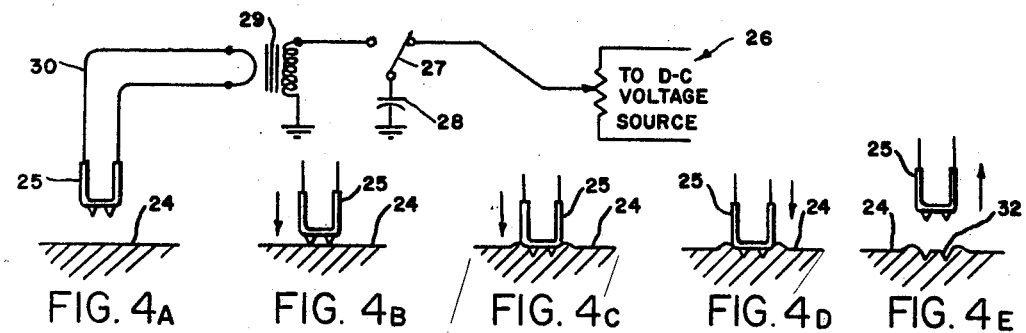
FIG. 4A is a diagrammatic view of another variation of said method shown in idle condition.
FIGS. 4B, 4C, 4D and 4E show the progressive steps of the method following FIG. 4A.
Figure 5:
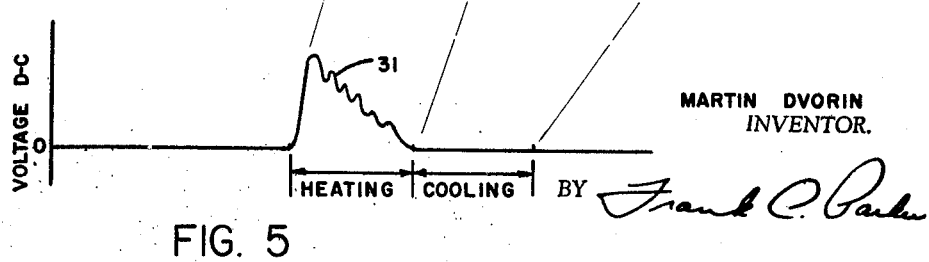
FIG. 5 is an electrical time-voltage graph showing the application of electrical power in the step illustrated in FIG. 4C.

Another of the aforementioned variations in the method for producing an identification mark is shown in FIGS. 4A to 5 wherein the thermoplastic surface 24 is impressed with a small die 25, said die being included in a capacitor circuit and being energized from a D-C voltage source 26. The voltage source 26 is connected through suitable resistors and a switch 27 to a capacitor 28 having such a size as to deliver a satisfactory quantity of electrical energy to the die 25 when connected thereto. As illustrated in FIG. 4A, the two-position switch in the position illustrated charges up the capacitor 28 and when it is desired to heat the die 25, the switch is swung over to the opposite position whereupon a suitable transformer 29 is energized to provide a heavy flow of electricity in the secondary circuit 30. FIG. 4A illustrates the idle position of the apparatus and FIG. 4B illustrates the die 25 being moved, as shown by the arrow, into positive contact with the surface 24 of the material to be marked with a light pressure which constitutes one distinctive step of the method. In the next step of the method, the poential energy contained in the capacitor 28 is discharged as aforesaid through a marking die 25 causing the die to heat suddenly and imprint itself into the surface 24 in somewhat similar manner as shown in FIG. 2C. The capacitor discharge is graphically shown by the portion 31 in FIG. 5 wherein a voltage time graph of the electrical characteristics of the circuit 30 are shown. In the next step of the method, the light pressure is continued on the die 25 after the electrical energy has been dissipated long enough for the die to cool in contact with the thermoplastic material 24 as shown in FIG. 4D and then the die 25 is withdrawn in the direction shown by the arrow leaving the marking 32 imprinted in the material 24. The time required for one complete cycle is substantially under 100 milliseconds.

THE MARK AND THE MARKING DIE

Although the marking die may be constructed in any desired profile shape as needed for different uses, the cross-sectional shape of the imprinted recess or groove element is the novel result sought and it is substantially the same for all marks both large and small, a prime example of which is shown in considerable detail in FIG. 6 of the drawing at 33. Inasmuch as the aforementioned groove 33 may be in the form of a circular mark or a straight mark, the plan view of the circular mark is shown as it appears in FIG. 7 and the straight mark is illustrated in FIG. 8. It is of prime importance that the sides 34 of the groove be either refractive or reflective surfaces and the bottom surface 35 be a planar surface lying parallel to the upper surface 24 of the thermoplastic or other heat-softenable material having a refractive index of about 1.53 in which the mark is formed.

Although attention is principally directed to the fact that the sides 34 of the groove 33 serve to refract some of the illuminating rays, it is possible to make the surfaces of the groove reflective by aluminizing them. For illuminating reflective surfaces, a beam divider, not shown, is introduced between the lens 38 and the groove and a beam of light is directed at the beam splitter.

It is characteristic of the ideal refractive mark that collimated light 36 striking the back surface of such light transmitting material on which the surface 24 is formed will come through the bottom surface 35 undeviated as shown by the rays 37 in FIG. 6 so as to be accepted within the effective aperture of the lens 38 belonging to a suitable viewing instrument. At the same time, it is important that the bright ring or streak, as the case may be, which is formed by the light rays 37 be surrounded by a dark background and therefore the surfaces 34 must have angularity such that their included angle α will cause deviation of the light rays 39 away from or outside of the lens 38 so that the surfaces 34 appear to be dark. However, the crest portions 40 of the material which are displaced by the die 41, as shown in FIG. 9, do provide a very narrow region through which undeviated light rays 42 may penetrate, said rays 42 being within the aperture of the lens 38 so that in the case of a round mark it will appear as shown in FIG. 7. Herein the rays 42 are transmitted through a narrow annular zone 43 while the greatest percentage of the light comes through the annular zone 44 and a light annular ring appears at 45 corresponding to the inner crest 40 shown in FIG. 6.

In order to achieve the above-described effect in the aforesaid reflectively coated mark, it is necessary to form the inclined sides of the groove at an included angle which is different from 90°.

Corresponding generally to FIG. 7 is shown a straight groove mark in FIG. 8 wherein the bottom section 35 of the groove appears as a relatively broad light streak 46 which is bracketed between two relatively weak light streaks 47 and 48 on either side of the strong central light portion 46.

The important thing in all of the marks as aforesaid is to produce a smooth light-refractive surface on each side of the groove which is inclined at such an included angle α that the side walls 49 and 50 are effective in accomplishing this purpose within the allotted heated period for the die and it is conceivable obviously that the elements 49 and 50 of the die illustrated in FIG. 9 may be arranged in many different configurations to suit different uses. The fact that the leading portion of the die is tapered serves to aid penetration of the surface of the sheet to be marked and hastens completion of the operation.

Although only certain forms and arrangements of the die, the mark and the method have been shown and described in detail, other forms and arrangements may be made and substitutions may be made therein without departing from the spirit of the invention.

I claim:

1. A method for permanently imprinting an identification mark by a heat conducting marking die in the surface of a heat-softenable material, the material having a temperature above which the material becomes soft, said method comprising the following steps performed in the order shown storing potential energy in a transducable relationship to said die, moving the heat conducting marking die into positive contact under a definite predetermined light pressure on said surface at a prescribed position thereon, said definite predetermined light pressure being substantially constant and insufficient to cause permanent deformation of said material while the temperature of said material is below said softening temperature, and sufficient to cause permanent deformation of said material when the temperature of said material is above said softening temperature, releasing a predetermined quantity of said energy into said die to heat the die, said predetermined quantity of said energy being sufficient to raise the temperature of said surface above said softening temperature, continuing the definite light pressure of said die against said surface until said surface has cooled to a temperature below said softening temperature, and retracting said die from said surface after said heat is dissipated thereby forming optical grooved surfaces by contact with the die said grooved surfaces having a flat portion surrounded by side walls inclined at an angle to the grooved flat surface other than 90° said sidewalls being refractive or reflective.

2. A method for imprinting a permanent identification mark in the surface of a heat-softenable material, the permanent deformation being localized around the mark, the material having a temperature above which the material becomes soft, said method comprising the following steps performed in the order shown moving an electrically resistant marking die into positive contact on said surface at a prescribed position thereon under a substantially constant pressure which is insufficient to cause permanent deformation of said material while the temperature of said material is below said softening temperature, and sufficient to cause permanent deformation of said material when the temperature of said material is above said softening temperature, heating said die electrically to a temperature above said softening temperature, continuing the pressure of said die against said surface at least during the transfer of heat energy from said die to said surface, and removing said die from said surface after said transfer is completed thereby forming optical grooved surfaces by contact with the die said grooved surfaces having a flat portion surrounded by side walls inclined at an angle to the grooved flat surface other than 90° said sidewalls being refractive or reflective.

3. A method for permanently imprinting an identification mark by a heat conducting marking die in the surface of a heat-softenable material, the material having a temperature above which the material becomes soft, said method consisting of the following steps performed in the order shown storing potential energy in a transducable relationship to said die, moving the heat conducting marking die into positive contact under a definite predetermined light pressure on said surface at a prescribed position thereon, said definite predetermined light pressure being substantially constant and insufficient to cause permanent deformation of said material while the temperature of said material is below said softening temperature, and sufficient to cause permanent deformation of said material when the temperature of said material is above said softening temperature, releasing a predetermined quantity of said energy into said die to heat the die, said predetermined quantity of said energy being sufficient to raise the temperature of said surface above said softening temperature, continuing the definite light pressure of said die against said surface until said surface has cooled to a temperature below said softening temperature, and retracting said die from said surface after said heat is dissipated thereby forming optical grooved surfaces by contact with the die said grooved surfaces having a flat portion surrounded by side walls inclined at an angle to the grooved flat surface other than 90° said sidewalls being refractive or reflective.

4. A method for imprinting a permanent identification mark in the surface of a heat-softenable material, the permanent deformation being localized around the mark, the material having a temperature above which the material becomes soft, said method consisting of the following steps performed in the order shown moving an electrically resistant marking die into positive contact on said surface at a prescribed position thereon under a substantially constant pressure which is insufficient to cause permanent deformation of said material while the temperature of said material is below said softening temperature, and sufficient to cause permanent deformation of said material when the temperature of said material is above said softening temperature, heating said die electrically to a temperature above said softening temperature, continuing the pressure of said die against said surface at least during the transfer of heat energy from said die to said surface, and removing said die from said surface after said transfer is completed thereby forming optical grooved surfaces by contact with the die said grooved surfaces having a flat portion surrounded by side walls inclined at an angle to the grooved flat surface other than 90° said sidewalls being refractive or reflective.

5. A method for permanently imprinting an identification mark by a heat conducting marking die in the surface of a photographic film, the photographic film having a characteristic temperature above which the photographic film becomes soft, the method comprising the following steps performed in the order shown placing the heat conducting marking die against the surface of the photographic film at a prescribed position thereon and under a substantially constant pressure which is insufficient to cause permanent deformation of the surface while the temperature of the surface is below the softening temperature, and sufficient to cause permanent deformation of the surface when the temperature of the surface exceeds the softening temperature, heating the die to a temperature above the softening temperature, maintaining the pressure of the die against the surface at least during the transfer of heat energy from the die to the surface, and retracting the die from the surface after the transfer is completed thereby forming optical grooved surfaces by contact with the die said grooved surfaces having a flat portion surrounded by side walls inclined at an angle to the grooved flat surface other than 90° said sidewalls being refractive or reflective.

References Cited

UNITED STATES PATENTS

| | | | |
|---|---|---|---|
| 1,237,352 | 8/1917 | Lundi et al. | 264—132 |
| 2,388,127 | 10/1945 | Downing | 264—320 |
| 2,460,874 | 2/1949 | Coberly | 264—293 XR |
| 2,532,501 | 12/1950 | Johnson | 264—1 XR |
| 3,313,231 | 4/1967 | Preismeyer | 264—320 |

ROBERT F. WHITE, Primary Examiner

RICHARD R. KUCIA, Assistant Examiner

U.S. Cl. X.R.

264—293, 320